United States Patent [19]

Marcus

[11] 4,145,605
[45] Mar. 20, 1979

[54] VEHICLE POSITION INDICATOR

[75] Inventor: Konrad H. Marcus, Holland, Mich.

[73] Assignee: Prince Corporation, Holland, Mich.

[21] Appl. No.: 786,293

[22] Filed: Apr. 11, 1977

[51] Int. Cl.² ................... G06F 15/20; G06M 3/14
[52] U.S. Cl. ................... 235/92 DN; 235/92 EV;
235/92 PE; 235/92 PL; 235/92 R; 364/424;
364/460; 364/561
[58] Field of Search ........ 235/92 DN, 92 PE, 92 EV,
235/92 DM, 92 CA, 92 PL, 95 R, 97; 364/424,
449, 460, 561; 324/166

[56] References Cited

U.S. PATENT DOCUMENTS

| | | | |
|---|---|---|---|
| 3,226,021 | 12/1965 | Dusinberre et al. | 235/92 DN |
| 3,614,617 | 10/1971 | Blake | 324/166 |
| 3,865,305 | 2/1975 | Sampey | 235/92 DN |
| 3,947,664 | 3/1976 | Cox et al. | 235/92 PL |
| 3,984,661 | 10/1976 | Mayer et al. | 235/92 PE |
| 4,053,749 | 10/1977 | Shinoda et al. | 235/92 DN |
| 4,068,307 | 1/1978 | Floyd | 364/424 |
| 4,068,308 | 1/1978 | Opper | 364/449 |
| 4,074,196 | 2/1978 | Webster | 324/166 |

Primary Examiner—Joseph M. Thesz
Attorney, Agent, or Firm—Price, Heneveld, Huizenga & Cooper

[57] ABSTRACT

A position indicator for automobiles, trucks, and other vehicles includes a numerical display of the vehicle position with respect to an interstate highway by providing a readout of the mile marker location of the vehicle. The display is actuated by an electrical circuit including a presettable up/down counter in which the initial location of the vehicle with respect to a reference marker along the highway is stored. Subsequent vehicle movement increments or decrements the stored count in response to the receipt of vehicle movement pulses from a pulse generator. A calibration circuit is provided to accurately calibrate the system for different vehicles. In one embodiment, a digital keyboard is provided for entering the initial vehicle position information.

22 Claims, 2 Drawing Figures

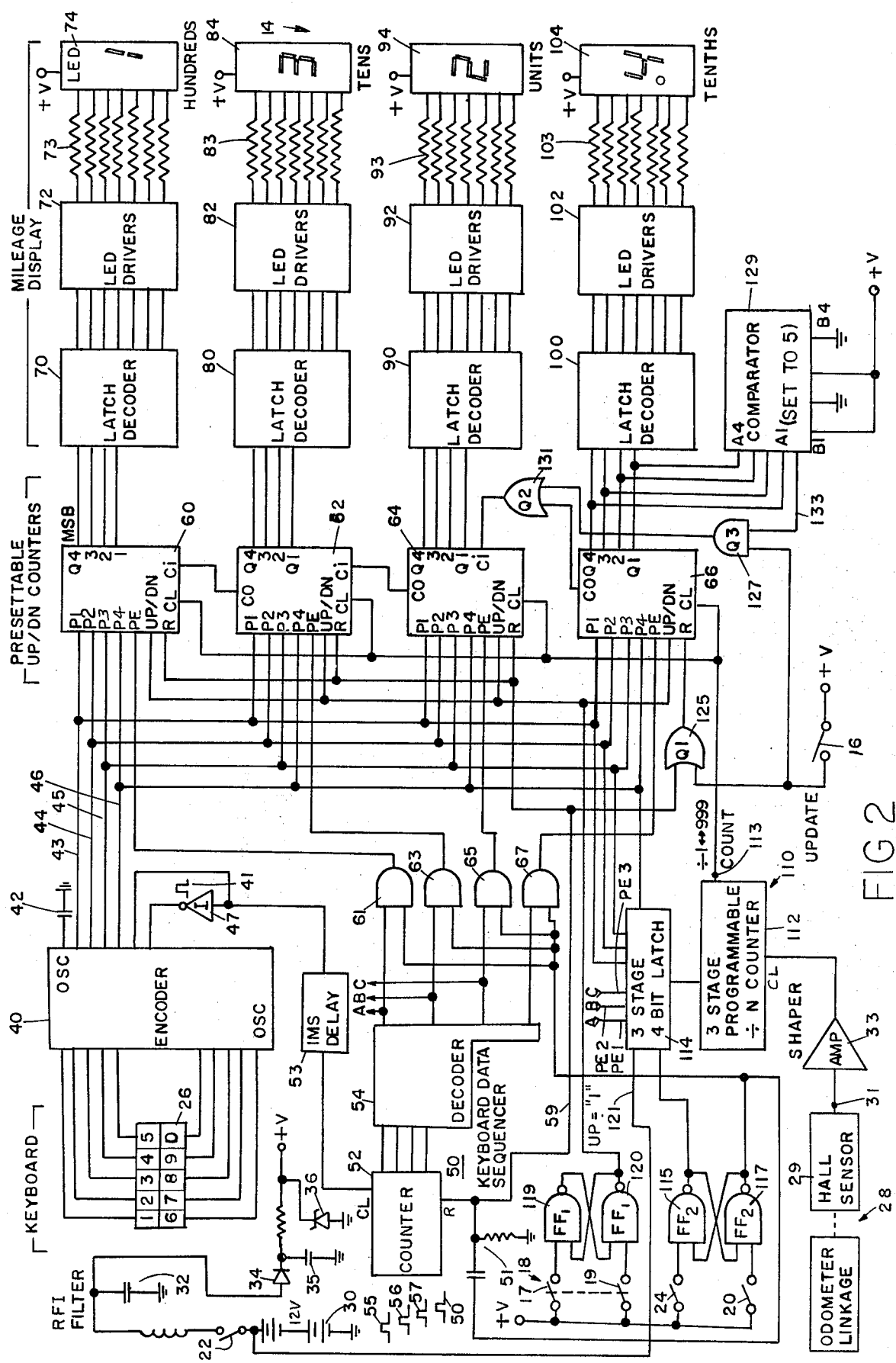

VEHICLE POSITION INDICATOR

BACKGROUND OF THE INVENTION

The present invention relates to a position indicator.

Since the relatively recent interest in citizens band (CB) radio for use in automobiles, two-way communication between motorists is becoming commonplace. Thus, traffic conditions, road hazards, and the like are frequently reported between passing motorists as they travel along the highways by the use of their CB radios.

In order for such information to be useful, the CBers must be capable of reporting their position or that of an event of interest to their fellow travelers. The parlance developed by the CB enthusiasts is to refer to such locations as their "10-20," a numerical code abbreviation for the reported location of the transmitter or something being reported. Along interstate highways, there are accurately positioned mile markers which are spaced exactly at one mile increments and either increase or decrease as to the location identified depending on the direction of travel along the roadway. These markers have been in use for several years by emergency vehicles and highway crews for their work. The CB radio enthusiasts have also found the equally spaced mile marker signs helpful in reporting their location as well as the location of events they are reporting to other motorists which they have witnessed during their travel. Since the mile markers, depending upon the direction of travel either increment or decrement, they provide accurate bench marks for all motorists on a given highway.

SUMMARY OF THE INVENTION

In order to facilitate the efficient use of the mile marker indicators currently available on almost every interstate highway as well as to provide a helpful motorist aid for both the CB enthusiasts as well as professionals such as law enforcement agents, truckers and highway and service vehicles, the present invention provides a unique vehicle position indicator. The vehicle position indicator provides a digital display in mileage which corresponds to the mile marker locations and in increments of tenths of a mile between mile markers.

The position indicator of the present invention includes a source of information representative of the distance traveled by a vehicle, means coupled to the source for storing predetermined location information and means for providing information representative of the vehicle position with respect to the predetermined location as it moves toward or away from the location and a display means coupled to the providing means for displaying the current vehicle position.

In the preferred embodiment of the invention for use with highway vehicles, the display provides a mileage marker readout in tenths of a mile such that the vehicle operator knows within this accuracy the exact position of the vehicle between mile markers. By providing such a system, the vehicle operator, and particularly, one utilizing a CB radio has a continuous digital readout of the vehicle's "10-20" which is helpful in reporting events to others and providing an advanced warning of upcoming mile marker locations such as exits, traffic accidents, or the like which have been brought to the operator's attention. Thus, the vehicle position indicator of the present invention provides an extremely helpful adjunct to the CB radio. These and other objects, advantages and features of the present invention will become apparent upon reading the following description thereof together with reference to the accompanying drawings in which:

BRIEF DESCRIPTION OF THE DRAWINGS

FIG. 2 is an electrical circuit diagram partly in block and schematic form of the electrical circuit employed in the vehicle position indicator shown in FIG. 1.

DETAILED DESCRIPTION OF THE PREFERRED EMBODIMENT

Figure 1:
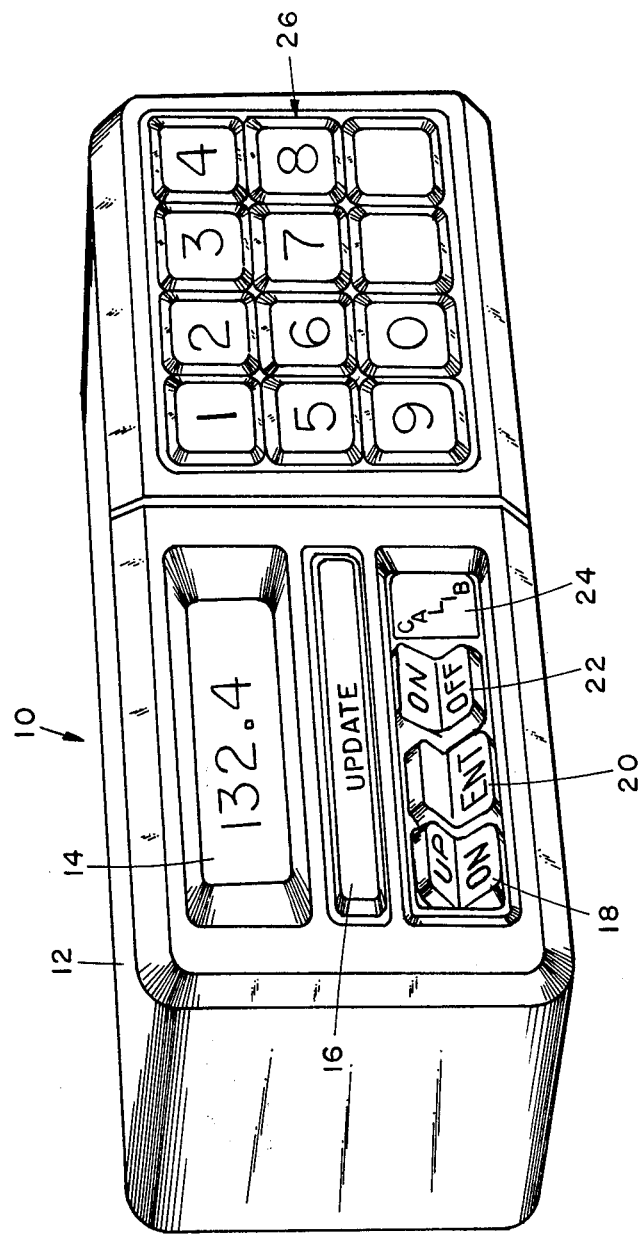
FIG. 1 is a perspective view of a vehicle position indicator according to the preferred embodiment of the present invention.

Referring initially to FIG. 1, there is shown a vehicle position indicator 10 embodying the present invention. The indicator is housed in a rectangular enclosure 12 suitable for mounting in a vehicle such as an automobile either under the dashboard utilizing conventional mounting hardware or at some other location convenient for the operator. The enclosure is preferably made by injection molding utilizing a thermoplastic material such a polyethylene or the like. In the upper left corner of the front panel of enclosure 12 there is included a four digit digital display 14 which can be of the light emitting diode (LED) type, liquid crystals (LCD) or other commercially available illuminated or light reflective displays. The controls for the vehicle position indicator include push button momentarily actuated update switch 16 positioned immediately below the display. Below the update switch there is provided a plurality of control switches including a count up/down rocker switch 18, a momentarily actuated enter switch 20, a power on/off switch 22, and a momentarily actuated calibrate switch 24.

Positioned to the right of the display and control switches is a data entry keyboard 26 including keys corresponding to the ten digits numbered 1-9 and 0 as well as two spare binary operated switches, unlabeled in the Figure. Switches 18-24 are commercially available as is keyboard 26.

Before describing the operation of the vehicle position indicator as shown in FIG. 1, a detailed description of the electrical circuitry incorporated within housing 12 is presented in conjunction with FIG. 2. Basically, the system includes a source 28 for information representative of the distance traveled by a vehicle, the display 14 and electrical circuit means for storing information representative of a predetermined location and coupled to source 28 for providing current vehicle information signals to be displayed by the display as the vehicle moves to or from a predetermined location.

In the embodiment shown in FIG. 2, power is supplied to the electrical circuitry from the vehicle's 12-volt battery 30 through the power on/off switch 22 and a radio frequency interference filter LC network 32. A reverse polarity protection diode 34 is provided at the output of filter 32 and an RC filtering network 35 couples the output of diode 34 to a zener diode 36 extending from the voltage output terminal +V to ground as shown in the Figure. Diode 36 serves to prevent overvoltage from damaging the electrical circuit components and is a commercially available diode preferably having a reverse breakdown voltage of in the neighborhood of ten volts. The system's supply voltage terminal +V is coupled to each of the circuit components in a conventional manner. For the sake of simplification of the circuit diagram, all of the interconnections between the voltage source +V and the various circuit components is not shown.

Before describing the detailed circuit construction, a brief overview of the major circuit components is noted. The heart of the system comprises four 4-bit presettable up/down counters 60, 62, 64 and 66 which can be preset through the digital keyboard 26 to a known mile marker location. Subsequent pulses from the sensing circuit 28 are then applied to these counters for either incrementing or decrementing the stored location information such that the output from the presettable counters which is applied to the display circuit 14 represents the current vehicle location. In order to provide calibration of the system, the pulses from source 28 are selectively divided by a preset number depending upon the type of vehicle such that for each tenth of a mile traveled, the counter for the least significant bit receives a pulse to increase or decrease the displayed output signal by one digit. Also, in order to periodically correct for mileage deviations due, for example, to the changing of lanes by the vehicle between mile markers, tire slippage under slippery road conditions, or the like, the update switch 16 is employed to round off the least significant digit. This is done as the vehicle passes a mile marker in the event the displayed mile marker location does not exactly correspond to the mile marker being passed by the vehicle.

In order to enter the binary data from the ten separate line outputs of keyboard 26 into the presettable up/down counters, the keyboard 26 outputs are coupled to a commercially available encoder 40. Encoder 40 can, for example, be a commercially available integrated circuit chip which internally includes a synchronization oscillator, the frequency of which is selected by externally coupled capacitor 42. Encoder 40 responds to a single binary input on a line from one of the keyboard keys to provide a 4-bit binary output signal on output lines 43-46. The standard 4-bit binary format is representative of the numerical key. Thus, conductor 43 represents the number $2^0$, 44 represents $2^1$, 45 represents $2^2$, and 46 represents $2^3$.

As each of the keyboard keys is actuated by the operator in order to sequentially enter the binary output signals representative of such key from the encoder 40 to the presettable counters 60, 62, 64 and 66, a keyboard sequencer circuit 50 is employed. The clock output pulse 41 from encoder circuit 40 is applied to a clock input terminal of counter 52 through a one millisecond delay circuit 53. Counter 52 responds to successive clock pulses 41 generated each time a keyboard key is actuated to provide successive 4-bit binary output signals applied to the input of a decoder circuit 54. Circuit 54 responds to the counter output signals to provide on four output lines thereof, four time sequential output enable signals 55, 56, 57 and 58 which are applied to the enable input terminals PE of counters 60, 62, 64 and 66, respectively through AND gates 61, 63, 65 and 67, respectively, which are enabled by a logic '1' generated by the enable switch 20.

Thus, in the example shown in FIG. 2, as the key representing numeral 1 is actuated, pulse 55 is generated to enable counter 60 to store the 4-bit binary data on input lines 43-46 which causes the hundredths digit 1 to be displayed by display means 14. As the second digit 3 is actuated by the operator, pulse 56 is generated activating counter 62 to read this binary information and cause its display as a 3 in the tenths digit location of the display. Subsequently, acutation of the unit's digit 2 causes the activation of generation of pulse 57 from decoder 54 activating counter 64 for storing this digit and causing its display on the unit's location of display 14. Finally, as the tenths digit 4 is actuated by the operator, pulse 58 enables counter 66 causing the storage and display of the 4 digit in the tenths display location. The delay circuit 53 assures that enabling pulses 55–58 are generated slightly after the keys are actuated by the operator to enter the data on lines 43–46 in the desired counter. The clock pulse 41 is also applied internally to encoder 40 through an inverter circuit 47 to eliminate contact bounce and to indicate the existence of valid data at the output. The keyboard data sequencer comprises integrated circuit chips 52 and 54 which are commercially available. Similarly, the presettable up/down counters 60, 62, 64, and 66 are commercially available integrated circuit chips. Counter 52 and counters 60, 62, 64 and 66 also include reset input terminals R with an RC differentiator circuit 51 coupled to the input to reset line 59 to provide a sharp reset pulse.

Each of the presettable up/down counters includes four input terminals $P_1$-$P_4$ coupled to data lines 43–46, respectively, and four output conductors from output terminals $Q_1$-$Q_4$, respectively, which are applied to the respective display modules. Display 14 includes a hundredths display module including a latch decoder circuit 70, a LED driver circuit 72 and the LED display modules 74. Each of these circuits is commercially available and is coupled in a conventional manner with current limiting resistors 73 positioned between the driver circuit 72 and the seven line input terminals for the display 74. Display 74 provides the hundredths display which, for the example shown in the Figure, is the reference numeral 1. Similarly, the tenths display module includes a latch decoder circuit 80, having its input terminals coupled to the output of counter 62 and output terminals coupled to the input terminals of LED driver circuits 82. Seven serially coupled current limiting resistors 83 couple the output terminals of the driver circuit 82 to the LED display 84 providing the tenths display. The unit's display includes a latch decoder 90 coupled to the outputs of counter 64 and its output terminals coupled to the inputs of the driver circuit 92. The driver output terminals are coupled to the inputs of unit display 94 through series resistors 93. Finally, the tenths display includes a latch decoder circuit 100 having its input terminals coupled to the output of the least significant bit counter 66 and having its output terminals coupled to the input of the driver circuit 102. The output of driver circuit 102 is coupled to the input of the LED display module 104 through series resistors 103. Circuits 70–104 are all commercially available modules interconnected in a conventional manner.

In order to vary the information displayed by display 14 as a function of vehicle position, source 28 is provided. Source 28 includes a commercially available hall effect sensor 29 mechanically coupled to a suitable moving element such as the odometer cable of the vehicle for providing pulses at an output terminal 31 thereof. These output pulses are applied to a shaping amplifier 33 to provide square wave output pulses therefrom. Circuits 29 and 33 are commercially available units such as employed with speed control units employed in the automotive industry. One such commercially available unit is manufactured by the Microswitch Corporation, Model 103SR.

Inasmuch as for each tenth of a mile traversed, it is desired that the tenths display 104 increments or decrements exactly one digit, a calibration circuit 110 is provided. Circuit 110 comprises a three-stage, programmable divide-by-N counter 112, each stage of which comprises a commercially available integrated circuit which can be programmed to divide the input pulses by a range of 1–999 to effect the desired calibration for a given vehicle. Typically, the number N by which the counter divides is selected by trial and error for a given vehicle and can be programmed into the counter 112 by the keyboard 26. It has been found, for example, that the number N for a 1977 Continental is 790. This number naturally will vary for a given vehicle when the vehicle's tires or the like are changed. This number can be ascertained by driving the vehicle over one mile intervals and changing the scaling number N depending upon whether or not the display has been changed by exactly one mile. If the display for the one mile traversed increments or decrements by greater than one mile, N is increased. If on the other hand the display increments or decrements by less than one mile, the number N is decreased. In order to program the counter 112, three-stages of 4-bit latch circuits 114 are provided and enabled by the calibrate switch 24 through cross-coupled NAND gates 115 and 117. Once switch 24 is closed, gates 61, 63, 65 and 67 are inhibited, thus, steering the keyboard output to the appropriate 4-bit latch 114. Closing switch 24 causes gate 115 to provide a logic output '1' signal applied to the enabling input terminals of the three latches 114 such that the 3-bit number N supplied by keyboard 26 and enabled in the same manner as provided into the presettable up/down counters (via interconnections A, B and C) is entered into the latch 114 and subsequently to the counter 112 coupled to the output terminals of the latch 114.

The output 113 of counter 112 once the number N is programmed provides a single pulse for each tenth of a mile traversed by the vehicle and is applied to the synchronously coupled programmable up/down counters 60–64 at the clock input terminals identified as CL in the Figure. Depending upon the vehicle's direction, the up/down switch 18 will control counters 60–66 to either increment or decrement the count stored in the counters. This is accomplished by the selection of up/down switch 18 having switch contacts 17 and 19, respectively. Switch contacts 17 and 19 are coupled to input terminals of cross-coupled NAND gates 119 and 120, respectively, defining a latch to provide an output logic '1' signal when switch 18 is in the up position, closing contact 19 or a logic output '0' when switch 18 is in the down position, closing contact 17. The logic '1' or logic '0' on output conductor 121 is applied to the up/down direction input terminal of each of the counters 60, 62, 64 and 66 causing the counters to respond to the pulse output from counter 112 to either increment or decrement the stored and displayed information.

As noted earlier, changing lanes, tire slip on slippery road conditions can, even though the system is accurately calibrated, cause the display output to deviate slightly from the actual mile markers traversed. Accordingly, the update feature provided includes a momentary push button switch 16 providing a logic '1' signal to the input of OR gate 125 having its remaining input coupled to the reset line 59 and its output terminal coupled to the reset input terminal R of counter 66. The update pulse is also applied to one input of AND gate 127 having its remaining input terminal coupled to output terminal 133 of a digital comparator circuit 129. Circuit 129 has one set of input terminals, $B_1$–$B_4$, selectively coupled to the +V supply to program it for the number 5. The remaining input terminals, $A_1$–$A_4$, for the signal information to be compared with the preprogrammed number are coupled to the four output lines of the least significant bit counter 66. Actuation of update switch 16 always resets counter 66 to zero. In the event the least significant bit is 5 or greater, output terminal 133 of comparator 129 is applied to gate 127 together with the update pulse from switch 16 provides a logic output '1' signal applied to OR gate 131 causing the unit's digit to increment to the next mile location. Thus, if the displayed mile marker location is less than one-half a mile higher than the actual location, actuation of the update button will zero the tens display to the mile marker. If it is one-half mile or less lower than the actual mile marker location, it will also zero the tens display to the actual mile marker. In the event the display is more than one-half a mile high, the unit's display is incremented to the next number. It may in some cases be necessary to reprogram the programmable counters through the keyboard 26 by entering the mile marker location. Once the system is calibrated, however, this will not normally occur.

OPERATION

Operation of the unit, including calibration, is achieved after the power on/off switch 22 is actuated to the on position by first actuating the enter switch 20 which is a momentarily depressed, push button switch. Actuation of this switch sets the latch circuit comprising cross-coupled NAND gates 115 and 117 to a logic output '1', thus generating a reset pulse applied to the reset input terminal of counter 52 via the differentiator circuit 51 and to the presettable up/down counters 60, 62, 64 and 66 via line 59. Counter 52 and the up/down counters are thus all set to logic '0'. Next, as the operator passes a predetermined location such as a mile marker, he selectively enters the mile marker location through keyboard 26 into the up/down counters by sequentially depressing four of the keys starting with the hundredths display. As soon as each of the numbers is actuated and entered into the up/down counters, it is displayed by the respective LED module. Depending upon the direction of travel of the vehicle along the highway, the mile markers will be increasing or decreasing. Accordingly, the operator actuates the up/down switch 18 to the desired position which provides either a logic '1' or a logic '0' to the direction inputs of each of the presettable up/down counters via line 121.

The calibration procedure previously described is then completed by actuation of the calibration switch 24 which enables the latch comprised of cross-coupled NAND gates 115 and 117 to provide a logic '1' output to the three-stage latch circuits 114. The calibration number N can be provided by the automobile manufacturer if the system is sold as original equipment, by the manufacturer of the vehicle position indicator who can provide a chart for different vehicles, or by trial and error by the vehicle operator. As a starting point, the scaling factor N can be the number 700 entered into the latch 14 by the keyboard 26. The operator then travels along the highway for at least one mile between successive mile markers and checks the display output to see if it is incremented or decremented by the exact amount. If not, N is adjusted as noted above by reactuating switch 24 and adjusting the number N entered through the keyboard until such time as the display corresponds nearly exactly to the actual distance traveled between mile markers.

The power to latch circuit 114 and counter 112 is supplied from the input side of switch 22 to always provide the desired scaling factor between the pulse generating source 28 and the presettable up/down counters.

In place of using the keyboard and circuit 112 naturally a conventional digital thumbwheel switch can be employed to permanently program counter 112. Also it is noted that greater or fewer stages for circuits 112 and 114 can be provided as necessary to provide a suitable range for the scaling factor N.

The system is now operational and as the vehicle travels along the highway, the display 14 will display the vehicle's location in terms of tenths of a mile with respect to the mile marker posts. In the event the vehicle changes lanes a significant number of times, stops on the shoulder of the road, or slippage occurs between the wheels and the pavement due to icy road conditions or the like, it is possible that the display will not correspond exactly to the mile marker location which can be easily confirmed by visual checking of the display with a mile marker post as the vehicle passes such a post. As the vehicle passes the mile marker post, the operator momentarily depresses the update switch 16 which as noted above provides a round-off feature to round-off the display to the nearest unit display corresponding to the mile marker.

The term vehicle as used herein encompasses highway vehicles as well as other transportation means such as vessels, airplanes or other moving objects which naturally can employ vehicle position indicators such as the type indicated herein for providing a reference display with respect to a predetermined location. This system, however, is uniquely suitable for interstate highway use by land vehicles where mile markers are employed. Similarly, the unit distance displayed can be any arbitrary unit such as nautical miles, kilometers, or the like since the unit distance is determined only by the scaling factor N which is operator selected. Various other applications of the present invention will be apparent to those skilled in the art as well as modifications to the specific embodiment disclosed and described herein without departing from the spirit or scope of the invention as defined by the appended claims.

The embodiments of the invention in which an exclusive property or privilege is claimed are defined as follows:

1. A vehicle position indicator for indicating a vehicle's position with respect to predetermined reference locations comprising:
    a source providing electrical pulses representative of the distance being traveled by a vehicle;
    operator programmable calibration circuit means comprising a programmable divide-by-N counter coupled to said source for dividing pulses therefrom by a divisor comprising a calibration number N to calibrate the system to assure the displayed vehicle position accurately corresponds to the vehicle's actual position, said divide-by-N counter providing output signals accurately representing vehicle travel and circuit means actuatable by the vehicle's operator for programming said divide-by-N counter with a calibration number N;
    means for storing information representative of a predetermined location and coupled to said calibration circuit means for receiving output signals therefrom for providing information representative of the vehicle position with respect to the predetermined location as the vehicle moves toward or away from the predetermined location;
    a digital keyboard and means for selectively coupling said keyboard to said calibration circuit means for insertion of the calibration number N into said divide-by-N counter and for selectively coupling said keyboard to said means for storing information to insert data representing the vehicle's predetermined location in said means for storing information; and
    display means coupled to said means for storing information for displaying to the vehicle operator the current vehicle position.

2. The system as defined in claim 1 wherein said means for storing information includes presettable up/down counter means.

3. The system as defined in claim 2 wherein said source comprises an electrical signal generator for providing pulses representative of incremental distance of travel of a vehicle and wherein said up/down counter is an electrical circuit coupled to said calibration circuit means.

4. The system as defined in claim 3 wherein said means for storing information further includes a keyboard for the generation of signals representative of a predetermined location and circuit means coupling said keyboard to said up/down counter means for entering signals from said keyboard into said up/down counter means.

5. The system as defined in claim 4 wherein said means for selectively coupling said keyboard to said calibration circuit means and to said means for storing information comprises a keyboard data sequencer.

6. A vehicle position indicator comprising:
    an electrical signal generator for providing pulses representative of incremental distance of travel of a vehicle;
    means for storing information representative of a predetermined location and coupled to said source for providing information representative of the vehicle position with respect to the known location as the vehicle moves toward or away from the known location wherein said means for storing information includes presettable up/down counter means comprising an electrical circuit coupled to said signal generator, a keyboard for the generation of signals representative of a predetermined location and circuit means coupling said keyboard to said up/down counter means for entering signals from said keyboard into said up/down counter means;
    calibration circuit means coupled between said signal generator and said up/down counter means, said calibration circuit means including a programmable divide-by-N counter for dividing the output signals from said signal generator such that resultant signals from said calibration circuit represent a predetermined incremental distance of travel of a vehicle;
    display means coupled to said up/down counter means for displaying to the vehicle operator the current vehicle position; and
    update circuit means for updating the display to an incremental location display comprising a digital comparator having first input means coupled to said display means, second input means coupled to a signal source representing a predetermined display reference and a comparison output, said update circuit further including an operator actuated switch and gate circuit means having inputs coupled to said operator actuated switch and to said output of said comparator and an output coupled to said up/down counter means and operable to round off the information in said up/down counter means in response to the actuation of said operator actuated switch for displaying an incremental location.

7. The system as defined in claim 6 wherein said keyboard comprises a plurality of single pole switches and wherein said circuit means coupling said keyboard to said up/down counter means comprises an encoder coupled to said switches and a keyboard sequencer circuit coupling said encoder to said presettable up/down counter means.

8. A vehicle position indicator comprising:
signal generator means adapted to be coupled to a movable element of a vehicle for providing output pulses representing distance traveled by a vehicle;
a programmable counter having an input coupled to said signal generator means, an output terminal, and operator actuated means for programming said programmable counter to divide the pulses from said signal generator means by a predetermined scaling factor N for calibrating said vehicle position indicator;
presettable counter means having a pulse input terminal coupled to said output terminal of said programmable counter, said presettable counter means including data output terminal means and preset data input terminal means;
display means coupled to said data output terminal means; and
a digital keyboard and circuit means for coupling said keyboard to said preset data input terminal means for entering signals representing a predetermined location in said presettable counter means and for programming said programmable counter with the scaling factor N.

9. The system as defined in claim 8 wherein said presettable counter means comprises an up/down counter and includes count direction control terminal means and said system further includes means coupled to said count direction control terminal means to provide control signals there to such that said counter selectively increments or decrements its stored count in response to said control signals.

10. A vehicle position indicator comprising:
signal generator means adapted to be coupled to a movable element of a vehicle for providing output pulses representing distance traveled by a vehicle;
a programmable counter having an input coupled to said signal generator means, an output terminal and means for programming said programmable counter to divide the pulse from said signal generator means by a predetermined scaling factor N;
presettable counter means having a pulse input terminal coupled to said output terminal of said programmable counter, said presettable counter means including data output terminal means and preset data input terminal means and wherein said presettable counter means comprises an up/down counter and includes count direction control terminal means and said system further includes means coupled to said count direction control terminal means to provide control signals thereto such that said counter selectively increments or decrements its stored count in response to said control signals;
display means coupled to said data output terminal means;
data generating means including a digital keyboard coupled to said preset data input terminal means for entering signals representing a predetermined location in said presettable counter means; and
update circuit means for updating said display means to display an incremental location and comprising a digital comparator having first input means coupled to said data output terminal means, second input means coupled to a signal source representing a predetermined display reference, and a comparison output, said update circuit further including an operator actuated switch and gate circuit means having inputs coupled to said operator actuated switch and to said output of said comparator and an output coupled to said up/down counter means and operable to round off the data information in said up/down counter means in response to the actuation of said operator actuated switch for displaying an incremental location.

11. The system as defined in claim 10 wherein said digital keyboard comprises a plurality of single pole switches, an encoder coupled to said switches, and a keyboard sequencer circuit coupling said encoder to said preset data input terminal means of said presettable up/down counter means.

12. A vehicle position indicator comprising:
a source of electrical signals representative of the distance being traveled by a vehicle;
circuit means for storing information representative of a predetermined location and coupled to said source for providing location signals representative of incremental vehicle positions with respect to the predetermined location as the vehicle moves toward or away from the known location;
digital display means coupled to said circuit means for displaying to the vehicle operator the current vehicle position; and
update circuit means for updating said display to a location display with the least significant digit equal to zero comprising a digital comparator having first input means coupled to said display means, second input means coupled to a signal source representing a predetermined display reference and a comparison output, said update circuit means further including an operator actuated switch and gate circuit means having inputs coupled to said operator actuated switch and to said output of said comparator and an output coupled to said circuit means and operable to modify the location signals developed by said circuit means in response to the actuation of said operator actuated switch for displaying an incremental location.

13. The system as defined in claim 12 wherein said means for storing information includes presettable up/down counter means.

14. The system as defined in claim 13 wherein said source comprises an electrical signal generator for providing pulses representative of incremental distance of travel of a vehicle and wherein said presettable up/down counter means is an electrical circuit coupled to said signal generator.

15. The system as defined in claim 14 wherein said circuit means for storing information further includes a keyboard for the generation of signals representative of a predetermined location and circuit means coupling said keyboard to said up/down counter means for entering signals from said keyboard into said up/down counter means.

16. The system as defined in claim 15 and further including calibration circuit means coupled between said signal generator and said up/down counter means, said calibration circuit means including a programmable divide-by-N counter for dividing the output signals from said signal generator such that resultant signals from said calibration circuit represent a predetermined incremental distance of travel of a vehicle.

17. The system as defined in claim 16 wherein said keyboard comprises a plurality of single pole switches and wherein said circuit means coupling said keyboard to said up/down counter means comprises an encoder coupled to said switches and a keyboard sequencer circuit coupling said encoder to said presettable up/down counter means.

18. A vehicle position indicator comprising:
signal generator means adapted to be coupled to a movable element of a vehicle for providing output pulses representing distance traveled by a vehicle;
a programmable counter having an input coupled to said signal generator means, an output terminal and means for programming said programmable counter to divide the pulse from said signal generator means by a predetermined scaling factor N;
presettable up/down counter means having a pulse input terminal coupled to said output terminal of said programmable counter, said presettable up/down counter means including data output terminal means and preset data input terminal means;
display means coupled to said data output terminal means;
data generating means coupled to said preset data input terminal means for entering signals representing a predetermined location in said presettable counter means; and
update circuit means for updating said display means to display an incremental location and including an operator actuated switch to round off the least significant digit of information to be displayed in response to the actuation of said operator actuated switch for displaying an incremental location, said update circuit means comprising a digital comparator having first input means coupled to said data output terminal means, second input means coupled to a signal source representing a predetermined display reference, and a comparison output, said update circuit means further including gate circuit means having inputs coupled to said operator actuated switch and to said output of said comparator and an output coupled to said up/down counter means and operable to round off the data information in said up/down counter means in response to the actuation of said operator actuated switch for displaying an incremental location.

19. The system as defined in claim 18 wherein said presettable counter means comprises an up/down counter and includes count direction control terminal means and said system further includes means coupled to said count direction control terminal means to provide control signals thereto such that said counter selectively increments or decrements its stored count in response to said control signals.

20. The system as defined in claim 19 wherein said data generating means includes a digital keyboard.

21. The system as defined in claim 20 wherein said data generating means comprises a digital keyboard comprising a plurality of single pole switches, an encoder coupled to said switches, and a keyboard sequencer circuit coupling said encoder to said preset data input terminal means of said presettable up/down counter means.

22. A vehicle position indicator comprising:
a source of electrical signals representative of the distance being traveled by a vehicle;
circuit means for storing information representative of a predetermined location and coupled to said source for providing location signals representative of incremental vehicle positions with respect to the predetermined location as the vehicle moves toward or away from the known location;
digital display means coupled to said storage circuit means for displaying to the vehicle operator the current vehicle position; and
update circuit means coupled to said storage circuit means for updating said display means to display an incremental location with the least significant digit equal to zero and including an operator actuated switch, a reference signal source providing signals representing a predetermined least significant digit to be displayed by said display means, comparator circuit means having one input coupled to said reference signal source and the remaining input to said storage circuit means for comparing the least significant digit to be displayed with the signal from said reference signal source, gate circuit means having one input coupled to the output of said comparator circuit means and a remaining input coupled to said operator actuated switch and having an output coupled to said storage circuit means and operable to zero the least significant digit of information to be displayed in response to the actuation of said operator actuated switch for displaying the vehicle location.

* * * * *